(12) United States Patent
Baker et al.

(10) Patent No.: US 9,078,222 B2
(45) Date of Patent: Jul. 7, 2015

(54) COMMUNICATION SYSTEM, PRIMARY STATION AND METHOD OF TRANSMIT POWER CONTROL

(75) Inventors: Matthew P. J. Baker, Canterbury (GB); Timothy J. Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 950 days.

(21) Appl. No.: 11/568,544

(22) PCT Filed: May 5, 2005

(86) PCT No.: PCT/IB2005/051476
§ 371 (c)(1),
(2), (4) Date: Nov. 1, 2006

(87) PCT Pub. No.: WO2005/109674
PCT Pub. Date: Nov. 17, 2005

(65) Prior Publication Data
US 2007/0165577 A1    Jul. 19, 2007

(30) Foreign Application Priority Data

May 6, 2004  (GB) .................................. 0410109.3
Jun. 16, 2004  (GB) .................................. 0413394.8

(51) Int. Cl.
*H04B 7/216*    (2006.01)
*H04W 52/32*    (2009.01)

(52) U.S. Cl.
CPC .................................. *H04W 52/327* (2013.01)

(58) Field of Classification Search
CPC . H04W 52/327; H04W 52/143; H04W 52/24; H04W 52/247; H04W 52/54; H04W 52/545; H04W 52/60
USPC ............. 455/69, 423, 522; 370/332, 431, 318
See application file for complete search history.

(56) References Cited

U.S. PATENT DOCUMENTS

| | | | | |
|---|---|---|---|---|
| 5,319,672 | A * | 6/1994 | Sumiya et al. ................ | 375/142 |
| 6,028,851 | A * | 2/2000 | Persson et al. ................ | 370/329 |
| 6,240,098 | B1 * | 5/2001 | Thibault et al. ............... | 370/431 |
| 6,389,265 | B1 * | 5/2002 | Jeschke et al. ................. | 455/69 |
| 6,512,931 | B1 * | 1/2003 | Kim et al. ...................... | 455/522 |
| 2001/0012276 | A1 * | 8/2001 | Tsunehara et al. ............ | 370/318 |
| 2001/0015964 | A1 * | 8/2001 | Fuchisawa ..................... | 370/332 |
| 2001/0026544 | A1 * | 10/2001 | Miura ............................ | 370/335 |
| 2002/0141331 | A1 | 10/2002 | Mate et al. | |
| 2003/0003905 | A1 * | 1/2003 | Shvodian ...................... | 455/423 |
| 2003/0119452 | A1 * | 6/2003 | Kim et al. ....................... | 455/69 |

(Continued)

FOREIGN PATENT DOCUMENTS

| | | | |
|---|---|---|---|
| EP | 0999656 A1 | 5/2000 | |
| EP | 0999656 B1 | 5/2000 | |

(Continued)

OTHER PUBLICATIONS

Written Opinion of the International Searching Authority PCT/IB2005/051476.

(Continued)

*Primary Examiner* — German J Viana Di Prisco

(57) ABSTRACT

A transmit power control scheme for use in point-to-multipoint communication uses a random access channel for power control signals transmitted by the receiving stations (200).

18 Claims, 2 Drawing Sheets

(56) References Cited

U.S. PATENT DOCUMENTS

2003/0224813 A1* 12/2003 Lehtinen et al. ............. 455/513
2005/0129058 A1* 6/2005 Casaccia et al. ............. 370/464

FOREIGN PATENT DOCUMENTS

| | | |
|---|---|---|
| JP | 2000138632 A | 5/2000 |
| JP | 2001292096 A | 10/2001 |
| JP | 2003060567 A | 2/2003 |
| JP | 2003318816 A | 11/2003 |
| WO | 0173970 A2 | 10/2001 |
| WO | 03071816 A1 | 8/2003 |
| WO | 2004013981 A2 | 2/2004 |
| WO | 2004021604 A1 | 3/2004 |

OTHER PUBLICATIONS

ISR, International Search Report No. WO2005/109674A1.

* cited by examiner

COMMUNICATION SYSTEM, PRIMARY STATION AND METHOD OF TRANSMIT POWER CONTROL

The invention relates to a communication system comprising a primary station and a plurality of secondary stations, to a primary station for use therein, and to a method of transmit power control in such a communication system.

In a radio communication system comprising a primary station and a plurality of secondary stations, for example a mobile phone system, transmissions from a primary station to a secondary station take place on a downlink channel and transmissions from a secondary station to a primary station take place on an uplink channel. It is known to use downlink closed-loop transmit power control in which a secondary station measures the quality of a received, power controlled downlink signal and transmits transmit power control (TPC) commands to the primary station so that an adequate, but not excessive, received signal level is maintained at the secondary station despite fluctuations in downlink channel conditions.

In point-to-point communication where a plurality of secondary stations receive individually addressed information signals on the downlink a separate power control loop is operated for each secondary station. Each secondary station determines the quality of its respective downlink signal and transmits TPC commands according to its prevailing channel conditions, and the transmit power is controlled individually for each secondary station.

There is a requirement to introduce point-to-multipoint transmission for providing broadcast services, such as Multimedia Broadcast Multicast Service (MBMS) in the Universal Mobile Telecommunication System (UMTS), in which the same data is transmitted on a downlink from a primary station to a plurality of secondary stations.

One way of operating point-to-multipoint transmission is to transmit at a constant power level on the downlink, at a power level sufficient for the secondary stations experiencing the poorest reception conditions to receive the data. However, such a scheme is wasteful of power and may cause interference.

A more efficient way of operating is to adapt the point-to-point downlink closed-loop transmit power control scheme to the point-to-multipoint scenario. One way of doing this is for each participating secondary station to measure the quality of a point-to-multipoint power-controlled downlink signal and to transmit TPC commands to the primary station. The primary station receives the TPC commands from each secondary station and decides on a transmit power level that will satisfy all, or at least the majority, of the secondary stations. Using such a scheme, the primary station may be able to use a lower transmit power when all the participating secondary stations are experiencing good reception conditions. When using such a power control scheme, sufficient channel resources, i.e. time, frequency or codes, must be allocated for the participating secondary stations to transmit their TPC commands in individual channels. With a large number of participating secondary stations, a large number of resources must be allocated.

An object of the present invention is to provide an improved point-to-multipoint data transmission service.

According to a first aspect of the invention there is provided a method of transmit power control in a communication system comprising a primary station and a plurality of secondary stations, the method comprising at each secondary station:
receiving a first signal transmitted by the primary station;
measuring a parameter of the received first signal;
deriving a second signal from the measured parameter;
transmitting the second signal; and
at the primary station:
transmitting the first signal;
receiving the second signals;
deriving a power control signal from the received second signals;
controlling the transmit power of the first signal in accordance with the power control signal;
wherein the transmission of the second signals comprises a plurality of the secondary stations transmitting common signals in a common time period in a common frequency allocation.

According to a second aspect of the invention there is provided a communication system comprising a primary station and a plurality of secondary stations, each secondary station comprising:
means for receiving a first signal transmitted by the primary station;
means for measuring a parameter of the received first signal;
means for deriving a second signal from the measured parameter;
means for transmitting the second signal;
and the primary station comprising:
means for transmitting the first signal;
means for receiving the second signals;
means for deriving a power control signal from the received second signals;
means for controlling the transmit power of the first signal in accordance with the power control signal;
wherein the means for transmitting the second signals are adapted to transmit a common signal in a common time period in a common frequency allocation.

According to a third aspect of the invention there is provided a primary station for use in a communication system comprising a plurality of secondary stations, the primary station comprising:
means for transmitting a first signal;
means for receiving second signals from secondary stations;
means for deriving a power control signal from the received second signals, the second signals comprising a plurality of common signals received in a common time period in a common frequency allocation;
means for controlling the transmit power of the first signal in accordance with the power control signal.

By permitting a plurality of secondary stations to transmit a common second signal in a common time period in a common frequency allocation, in other words to use common channel resources, fewer channel resources are required for power control. This has the advantage of leaving more channel resources available for other services. Furthermore, the primary station will receive the combination of the common signals, so the transmit power of the secondary stations can be reduced. This has the advantage of reducing interference.

In one embodiment, the secondary station transmits the second signal only if the measured parameter of the received first signal satisfies a predetermined criterion. In another embodiment, the secondary station transmits the second signal whatever the result of the measurement.

In a further embodiment, the secondary station is adapted to transmit any of a plurality of different second signals, the signal being selected in dependence on the result of the measurement of the parameter of the received first signal. Each of these different second signals are distinguished by using different codes, or being transmitted in different time periods, or being transmitted in different frequency allocations. A combination of these distinguishing characteristics may be used. In contrast, identical second signals transmitted by different secondary stations are transmitted using a common code, in a common time period in a common frequency allocation.

In another embodiment, the transmission of a particular second signal may take place with a non-unity probability, where the probability of transmission may be dependent on the value of a measured parameter of the received first signal. The relationship between the transmission probabilities and the measured parameter values may be pre-determined, or signalled to the secondary station, or the transmission probability may be directly signalled to the secondary station. This embodiment reduces the number of second signals transmitted, thus reducing interference. If different transmission probabilities are applied for different second signals, this embodiment allows second signals of one type, such as those corresponding to poor reception quality, to be transmitted more often than those of a different type, such as those corresponding to good reception quality. This has the advantage that information needed to control the downlink reception quality by changing transmission power, can be made available to the primary station with fewer uplink transmissions, thus reducing interference. This embodiment also allows second signals of a single type to be transmitted with different probabilities depending on the measured parameter values.

The invention will now be described, by way of example only, with reference to the accompanying drawings wherein.

Figure 1:
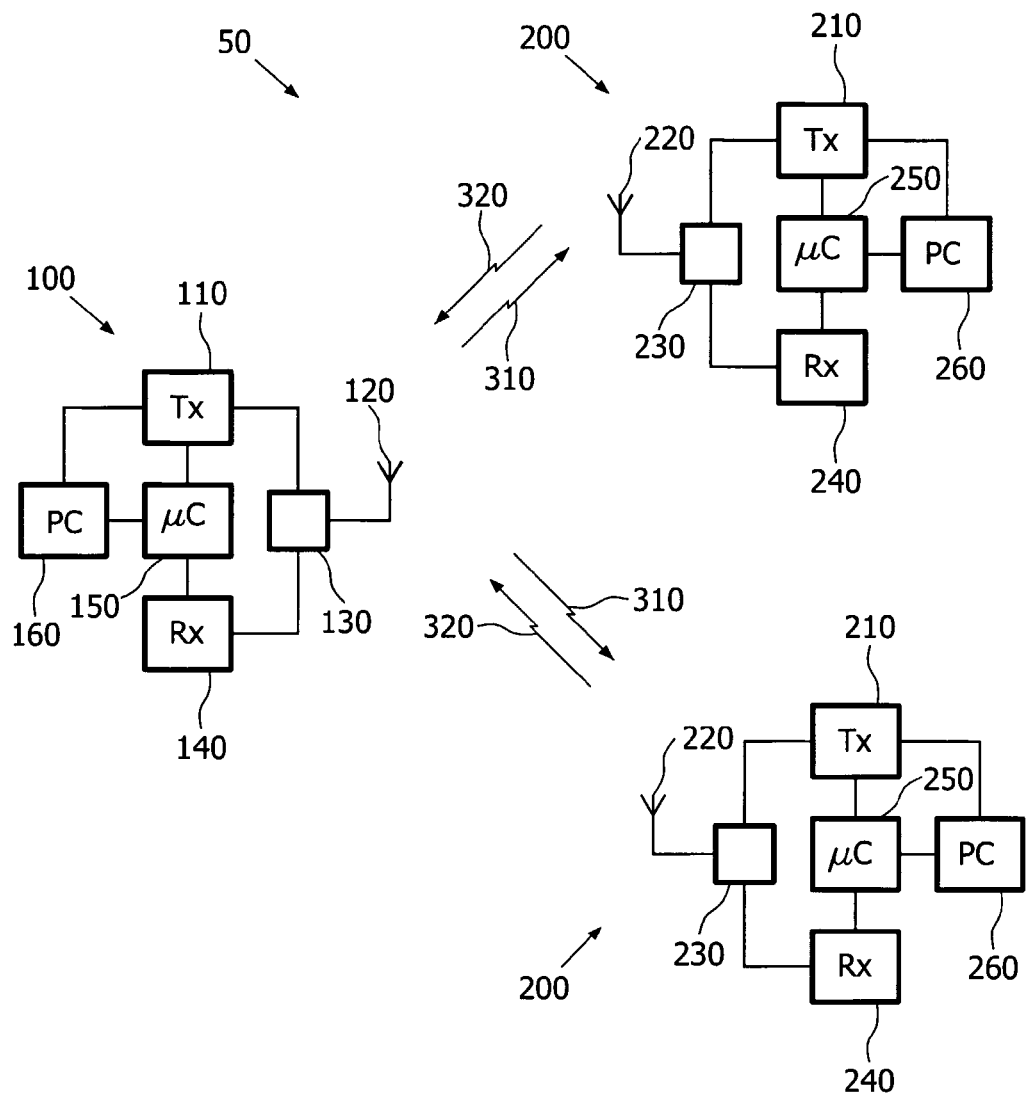
FIG. 1 is a block schematic diagram of a communication system.

Referring to FIG. 1, there is illustrated a radio communication system 50 comprising a primary station 100 and a plurality of secondary stations 200.

The primary station 100 comprises a transmitter 110 for transmitting a first signal on a downlink 310, for example a broadcast data signal, to each secondary station 200. The transmitter 110 has an output coupled to an antenna 120 via coupling means 130 which may be, for example, a circulator or changeover switch. The coupling means 130 is also coupled to an input of a receiver 140 for receiving uplink 320 signals from the antenna 120. Coupled to the transmitter 110 and the receiver 140 is a control means (µC) 150, for example a processor, for processing signals received from the secondary stations 200 and for deriving from the signals a power control signal. Coupled to the control means (µC) 150 and the transmitter 110 is a power control means 160 for controlling the transmit power of the transmitter 110 in response to the power control signals derived by the control means 150.

The secondary station 200 comprises a receiver 240 for receiving signals transmitted by the primary station 100 on the downlink 310. The receiver 240 has an input coupled to an antenna 220 via coupling means 230 which may be, for example, a circulator or changeover switch. The coupling means 230 is also coupled to an output of a transmitter 210 for transmitting uplink signals via the antenna 220. Coupled to the transmitter 210 and the receiver 240 is a control means (µC) 250, for example a processor, for making measurements on signals received from the primary station 100 and for deriving from the measurements a second signal which is transmitted on the uplink 320 by the transmitter 210 for effecting power control at the primary station 100. Optionally, coupled to the control means (µC) 250 and the transmitter 210 is a power control means 260 for controlling the transmit power of the transmitter 210 in response to power control commands received from the primary station 200.

Figure 2:
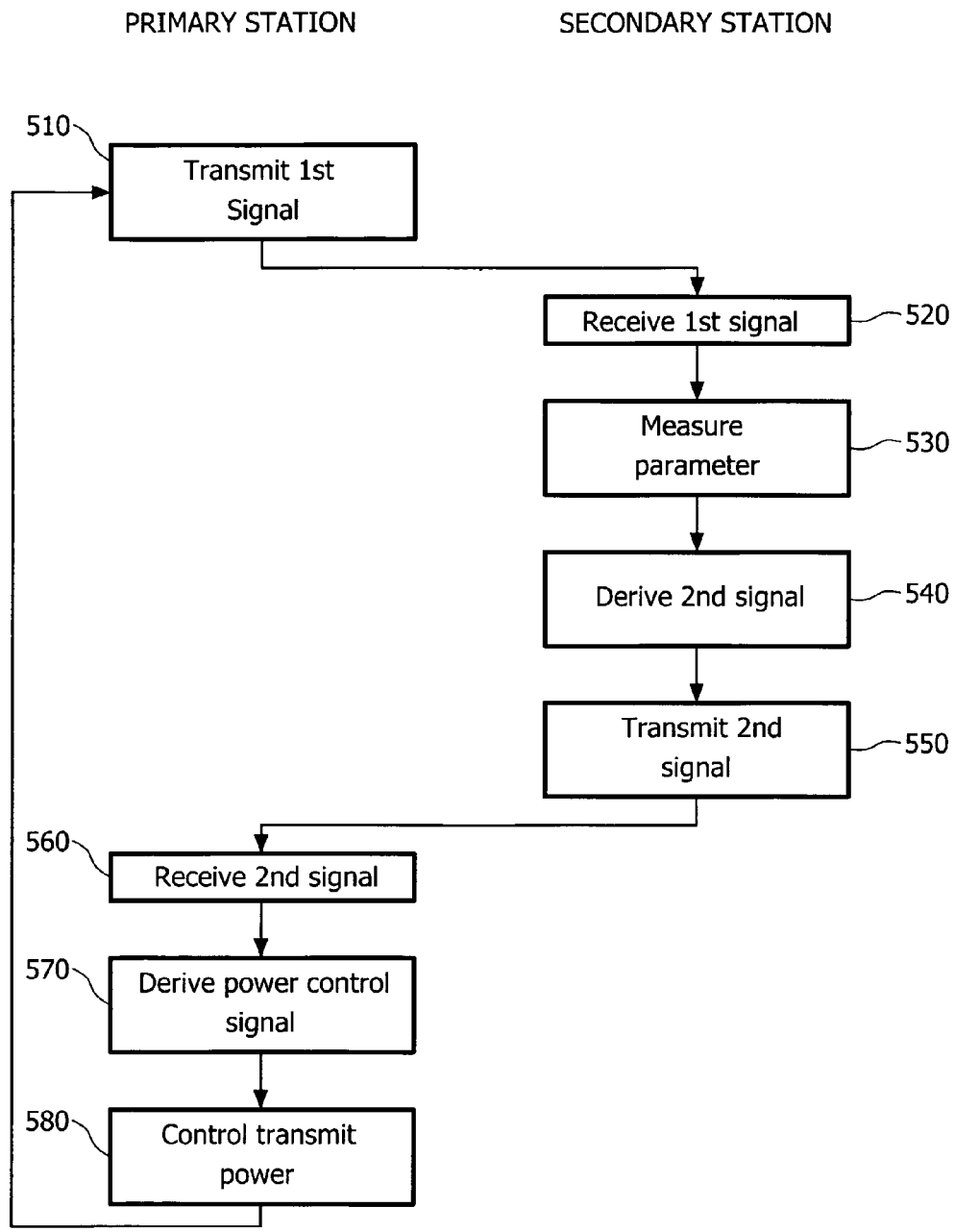
FIG. 2 is a flow chart of a method of transmit power control.

The operation of the radio communication system 50 will now be described with reference to the flow chart of FIG. 2. In FIG. 2, steps on the left hand side of the chart are performed by the primary station 100, and steps on the right hand side are performed by each secondary station 200.

At step 510 the primary station commences transmission of the first signal, via its transmitter 110, to each secondary station 200. The information conveyed by the first signal is intended for receipt by a plurality of secondary stations 200. Each secondary station wishing to receive the information implements the following steps.

At step 520 the first signal is received via the receiver 230.

At step 530 the control means 250 of the secondary station 200 measures a parameter of the received first signal.

The measured parameter may take any of many forms. Some examples of the measured parameter are signal-to-noise ratio (SNR), signal-to-interference ratio (SIR), signal level, bit error rate, block error rate, or a combination of these. A skilled person can readily identify other parameters which may be used instead of, or in combination with, the above example parameters.

At step 540 the control means 250 derives from the measured parameter a second signal for transmission to the primary station 200 for the purpose of transmit power control. The information content of the second signal depends on the parameter that was measured. Some examples, which can be used alone or in combination, are as follows:

a) Each uplink second signal may contain an indication, such as a TPC command, of whether the secondary station 200 wants the downlink transmit power to be increased or decreased. Such an indication may be derived by comparing the value of the measured parameter with a threshold value.

b) Each uplink second signal may contain an indication of the value of the measured parameter, such as a bit error rate, block error rate, SNR, SIR, signal level; in some embodiments, the indication comprises an indication of whether the value of the measured parameter exceeds a threshold.

c) Each uplink second signal may contain an indication of whether the secondary station 200 decoded a downlink data packet successfully or with unrecoverable errors.

A skilled person can readily identify other indications for inclusion in the second signal instead of, or in combination with, the above examples. Additional characteristics of the second signal are presented below.

At step 550 the second signal is transmitted by the transmitter 210.

At step 560 the receiver 140 of the primary station 100 receives each of the second signals transmitted by the secondary stations 200.

At step 570 the control means 150 processes the received second signals and derives a power control signal. At this step the control means 150 determines whether to increase the transmit power of the primary station 100, or to decrease it. Optionally, it may decide to leave the transmit power unchanged. The algorithm used to derive the power control signal depends on the type of indication included in the second signal. Examples of possible algorithms are as follows:

a) The control means 150 may determine whether any secondary station 200 requires a higher signal level in order to ensure reliable reception of the downlink first signal, and increase the transmit power if this is the case for any secondary station 200.

b) The control means 150 may estimate the number of, or proportion of, secondary stations 200 that require a higher signal level in order to ensure reliable reception of the downlink first signal, and increase the transmit power only if this number or proportion exceeds a threshold. Under these circumstances, some secondary stations 200 experiencing poor reception conditions may remain with unreliable reception, at the choice of the control means 150. One way of distinguishing identical signals transmitted simultaneously from different secondary stations 200 is to examine the relative propagation delays indicated by different correlation peaks generated when detecting the second signals.

At step 580 the power control means 160 controls the transmit power of the transmitter 110 according to the power control signal derived by the control means 150.

Flow then returns to step 510 where the process is repeated while the first signal continues to be transmitted.

According to the invention the transmission of the respective second signals comprises a plurality of the secondary stations 200 transmitting common signals in a common time period in a common frequency allocation. All secondary stations 200 transmitting the same indication on the uplink transmit using common signals, in the same time period in the same frequency allocation. Because a plurality of secondary stations 200 use the same channel resources (i.e. code, time, and frequency) for transmission of their respective second signals, fewer channel resources are required.

The following examples illustrate some options for the uplink second signals:

a) There may be two available uplink indications, corresponding to TPC commands. When a secondary station 200 transmits a TPC command to either increase transmit power or decrease transmit power, the "up" command is transmitted as one second signal and the "down" command is transmitted as another second signal which is distinct from the "up" signal. The "up" command will be transmitted by all those secondary stations 200 requesting the power to be increased, and the "down" command will be transmitted by all those secondary stations 200 requesting the power to be decreased. These two different uplink second signals may be distinguished by using different codes, or being transmitted in different time periods, or by being transmitted in different frequency allocations. For example, the "up" and "down" commands may be transmitted in one time period and be distinguished by the use of different signal codes. As another example, the "up" commands may be transmitted in one time period and the "down" commands transmitted in a different time period, but use the same signal code. As another example, the "up" and "down" commands may be transmitted in one time period using the same signal code, and be distinguished by the use of different frequency allocations. A combination of these distinguishing characteristics may be used, for example different codes in combination with different time periods.

b) More than two distinct signals may be used, for example four, to represent different values of the measured parameter, such as four ranges of error rate or SIR. The signals may be distinguished by using four different codes, four different time periods, or four different frequency allocations.

c) More than two distinct signals may be used, for example four, to represent "up" and "down" commands in combination with an indication of different grades of received signal level. In this example, secondary stations 200 transmitting a "down" command transmit in a single time period, whereas secondary stations 200 transmitting an "up" command can indicate either a medium, low or a very low signal level and their transmissions may be segregated into three separate time periods, which can ease detection by the primary station 100.

d) For one or more values of the measured parameter of the received first signal, the secondary stations 200 may refrain from deriving or transmitting the second signal, which has the benefit of reducing interference and power consumption in the secondary stations 200. For example, the secondary stations 200 may transmit second signals corresponding to only "up" commands, refraining from transmitting "down" commands; in this case the primary station 100 assumes a "down" value by default. As another example, secondary stations 200 may refrain from making an uplink transmission of the second signal if the measured parameter indicates that the quality of the received downlink first signal is below a threshold value; this can prevent the futile increase of transmit power and reduce interference when the reception conditions of the secondary station 200 are too poor to be overcome by a power increase. Optionally, the primary station 100 may transmit to the secondary stations 200 an indication of a criterion that the secondary stations 200 shall use to determine whether to refrain from deriving or transmitting the second signal.

e) The transmission of a particular second signal may take place with a sub-unity probability, which may be dependent on the value of a measured parameter of the received first signal. The relationship between the transmission probabilities and the measured parameter values may be pre-determined, or signalled to the secondary station.

At the primary station 200, the common second signals received in a common time period and common frequency allocation will be combined by the receiver 140. Because it is the combined signals that are detected by the receiver 140, the transmit power level of the uplink signals may be reduced, for example by the secondary station power control means 260 in response to TPC commands transmitted by the primary station 200.

Optionally, when the primary station 100 has received sufficient uplink information to decide on the downlink transmit power, the primary station 100 may transmit a downlink, third signal to terminate incomplete uplink second signals, or to pre-empt the transmission of uplink second signals that have not yet commenced. In this way power consumption of the secondary stations 200 can be reduced and interference reduced. In particular, this option may be applied when secondary stations 200 increase the transmit power during the second signal, for example by transmitting the second signal a plurality of times with progressively increasing transmit power, while awaiting said third signal or the expiry of a time period. The power increase may be, for example, a ramped increase or a stepped increase. In some embodiments, the information-bearing part of the second signal may be transmitted after a number of preamble signals of progressively increasing transmit power, and on ceasing the transmission of the preamble signals in response to receipt of the third signal the secondary stations may not terminate transmission of the second signal but continue to transmit the information-bearing part of the second signal.

Throughout the specification and claims the invention has been described with respect to controlling the transmit power. However the invention is also applicable to controlling other transmission characteristics instead of, or in addition to, controlling the transmit power. Such other additional characteristics may be, for example, bit rate, error control coding, modulation scheme.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of communications which may be used instead of or in addition to features already described herein.

The invention claimed is:

1. A method of transmit power control in a communication system comprising a primary station and a plurality of secondary stations, the method comprising the steps of:
at each secondary station:
receiving a first signal transmitted by the primary station;
measuring a parameter of the received first signal;
deriving a second signal from the measured parameter;
transmitting the second signal; and
at the primary station:
transmitting the first signal;
receiving the second signals;
deriving a power control signal from the received second signals;
controlling the transmit power of the first signal in accordance with the power control signal;
wherein the transmitting of the second signal takes place with a sub-unity probability such that there is a functional relationship between the sub-unity probability and the measured parameter of the first received signal and wherein parameters determining said functional relationship are signaled to a secondary station of the plurality of secondary stations
wherein at each secondary station transmitting second signal comprises selecting a combination of spreading code, time period and frequency allocation from a plurality of combinations, the selection being dependent on a value of the measured parameter.

2. A method as claimed in claim 1, wherein the plurality of combinations comprises different codes for transmission in a common time period.

3. A method as claimed in claim 1, wherein the plurality of combinations comprises a common code for transmission in different time periods.

4. A method as claimed in claim 1, wherein the plurality of combinations comprises a common code for transmission in a common time period using different frequency allocations.

5. A method as claimed in claim 1, wherein the probability is dependent on the value of the measured parameter of the received first signal.

6. A method as claimed in claim 1, wherein each second signal comprises at least one of:
an indication to increase the transmit power;
an indication to decrease the transmit power;
an indication that the first signal was decoded successfully;
an indication that the first signal contained unrecoverable errors;
an indication that an error rate of the first signal exceeds a threshold value; or
an indication of a quality level of the first signal.

7. A method as claimed in claim 6, wherein the indication of a quality level comprises at least one of:
an indication of an error rate;
an indication of a signal-to-interference ratio;
an indication of a signal-to-noise ratio;
an indication of a signal level.

8. The method as claimed in claim 1, comprising the steps of:
at each secondary station, increasing transmit power during the second signal;
at the primary station, in response to receiving a portion of the second signal, transmitting a third signal; and
at each secondary station, in response to receiving the third signal, ceasing the power increase.

9. The method as claimed in claim 8, wherein ceasing the power increase comprises ceasing transmission of the second signal.

10. A communication system comprising a primary station and a plurality of secondary stations, each secondary station comprising:
a receiver configured to receive a first signal transmitted by the primary station;
a processor adapted to measure a parameter of the received first signal;
the processor being further adapted to derive a second signal from the measured parameter;
a transmitter configured to transmit the second signal; and
the primary station comprising:
a transmitter configured to transmit the first signal;
a receiver configured to receive the second signals;
a processor adapted to derive a power control signal from the received second signals;
the processor being further adapted to control the transmit power of the first signal in accordance with the power control signal;
wherein the transmitting of the second signal takes place with a sub-unity probability such that there is a functional relationship between the sub-unity probability and the measured parameter of the first received signal and wherein parameters determining said functional relationship are signaled to a secondary station of the plurality of secondary stations
wherein the processor is further adapted to select a combination of spreading code, time period and frequency allocation from a plurality of combinations, the selection being dependent on a value of the measured parameter.

11. The communication system as claimed in claim 10, wherein the plurality of combinations comprises different codes for transmission in a common time period.

12. The communication system as claimed in claim 10, wherein the plurality of combinations comprises a common code for transmission in different time periods.

13. The communication system as claimed in claim 10, wherein the plurality of combinations comprises a common code for transmission in a common time period using different frequency allocations.

14. A communication system as claimed in claim 10, wherein the probability is dependent on the value of the measured parameter of the received first signal.

15. A communication system as claimed in claim 10, wherein each second signal comprises at least one of:
an indication to increase the transmit power;
an indication to decrease the transmit power;
an indication that the first signal was decoded successfully;
an indication that the first signal contained unrecoverable errors;
an indication that an error rate of the first signal exceeds a threshold value; or
an indication of a quality level of the first signal.

16. The communication system as claimed in claim 15, wherein the indication of a quality level comprises at least one of:
an indication of an error rate;
an indication of a signal-to-interference ratio;
an indication of a signal-to-noise ratio; or
an indication of a signal level.

17. A communication system as claimed in claim 10, wherein:

the secondary station means for transmitting is adapted to increase its transmit power during the second signal;

the primary station comprises means, responsive to receiving a portion of the second signal, for transmitting a third signal; and the secondary station means for transmitting is further adapted to, responsive to receiving the third signal, cease the power increase.

18. A primary station for use in a communication system comprising a plurality of secondary stations, the primary station comprising:

a transmitter configured to transmit a first signal;

a receiver configured to receive from secondary stations second signals;

a processor adapted to derive a power control signal from the received second signals;

the processor being further adapted to control the transmit power of the first signal in accordance with the power control signal;

wherein the transmitting of the second signal takes place with a sub-unity probability such that there is a functional relationship between the sub-unity probability and the measured parameter of the first received signal and wherein parameters determining said functional relationship are signaled to a secondary station of the plurality of secondary stations, and wherein the second signals received from the secondary stations are transmitted by selecting a combination of spreading code, time period and frequency allocation from a plurality of combinations, the selection being dependent on a value of the measured parameter.

* * * * *